(No Model.)
J. W. MARSH.
JOINT FOR ELECTRIC CONDUCTORS.
No. 483,074. Patented Sept. 20, 1892.
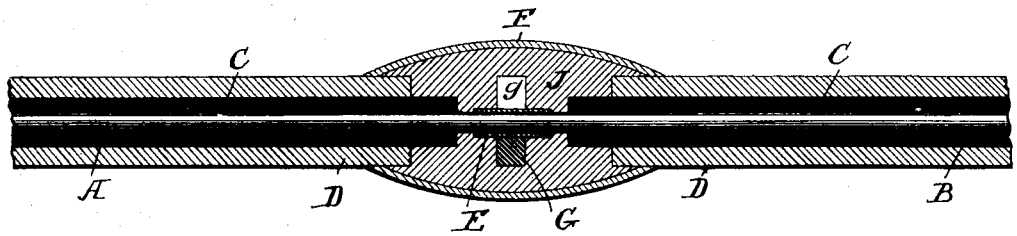
 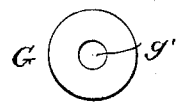 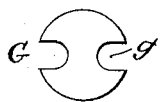
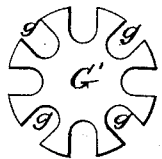
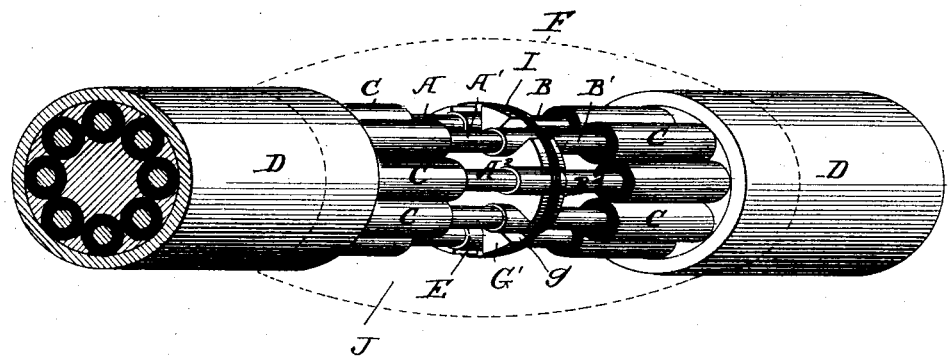
Witnesses
Inventor
J. W. Marsh
by Foster Freeman
Attorneys

UNITED STATES PATENT OFFICE.

JOSEPH W. MARSH, OF PITTSBURG, PENNSYLVANIA, ASSIGNOR TO THE STANDARD UNDERGROUND CABLE COMPANY, OF SAME PLACE.

JOINT FOR ELECTRIC CONDUCTORS.

SPECIFICATION forming part of Letters Patent No. 483,074, dated September 20, 1892.

Application filed December 21, 1891. Serial No. 415,739. (No model.)

*To all whom it may concern:*

Be it known that I, JOSEPH W. MARSH, a citizen of the United States, residing in Pittsburg, in the county of Allegheny and State of Pennsylvania, have invented certain new and useful Improvements in Joints for Electrical Conductors, of which the following is a specification.

My invention relates to joints for electrical conductors, and while the principles thereof may be applied to various forms and styles of conductors it is intended more particularly for use in connection with electric-light cables or cables over which currents of relatively high potential are passed.

The object of the invention more particularly is to provide simple and effective means whereby a perfect joint between the ends of the conductors of two or more adjacent cables may be secured, so as to interfere in the least possible way with the cable or its high specific insulation.

To these ends my invention consists in the features of construction and arrangement substantially as are more particularly pointed out hereinafter.

Referring to the accompanying drawings, Figure 1 is a longitudinal section showing a joint embodying my invention. Figs. 2, 3, 4, and 5 are side views of forms of disks; and Fig. 6 is a perspective view, partially in section, of a multiple cable, showing my invention applied thereto.

It is well known that there are great practical difficulties in uniting or splicing the ends of cables, especially such as are intended to carry currents of considerable strength, in such a manner as not to interfere with the insulating properties of the cable and without the disadvantages arising from the ordinary splices and the various forms adapted to overcome the difficulties. I will now describe my present invention and illustrate its application, so that it will be understood by those skilled in the art.

In the drawings, referring especially to Fig. 1, A B represent the conducting-wires of two adjacent sections of cable. C is the insulating material surrounding the conductor, and D is a shield, covering, or armor, which is preferably of metal, such as lead, and this in turn may be covered with any other protective material—such as braiding or other covering—usually applied.

In making the joint the adjacent ends of the conductor A B are bared by removing a portion of the insulating material therefrom and by removing the armor or shield, preferably at a greater distance from the end, so that the conductors are exposed. These conductors are then abutted closely together and a sleeve E is fitted over the adjacent ends, and this sleeve is preferably of conducting material—such as copper—and keeps the adjacent ends of the conductors in proper alignment and assists in completing the electric connections between them. The sleeve and its inclosed conductors are thoroughly united by solder suitably applied.

As ordinarily used it has been common to surround the sleeve and the adjacent exposed ends of the conductors with insulating material and subsequently to unite the cables by some sort of a joint, either a wiped or molded lead joint, as indicated at F. In my invention, however, I apply to the joint a block G, which is preferably of insulating material, as hard rubber, porcelain, indurated fiber, and the like, and which is also preferably of a size corresponding to the diameter of the cable. This block is fitted over the joint of the conductors, and, as shown in Fig. 2, it is provided with a slot $g$, while, as shown in Fig. 3, it is provided with a single opening $g'$, and this tends to more securely maintain the splice in proper position. The space between the adjacent ends of the armor and around the conductors is then filled with some insulating material, which may be in the form of tapes wound closely around the parts or plastic material applied thereto, and then the joint is preferably finished by uniting the armor of the adjacent conductors by a metal covering F, although this is not absolutely necessary; or an insulating-sleeve having an internal diameter closely approximating the external diameter of the cables may be slipped over the splice, slightly overlapping the lead cover of adjacent cable-sections, a metal covering cast upon the matrix thus formed, a hole tapped through the cast cover and insulating-sleeve and the interior spaces filled with molten insulating compound, and the hole in the cast cover soldered up, completing the joint, as described in Patent No. 464,475, dated December 1, 1891. It will be seen that in this way I produce a symmetrical union, the parts are positively held in their proper position, and can be thoroughly insulated. My invention is more particularly applicable, however, to cables in which there are a number of electric conductors—such, for instance, as indicated in Fig. 6, in which A A' A², &c., represent metallic conductors, each preferably surrounded by an insulated coating C, around which is applied the usual covering or armor D, while B B' B² represent corresponding conductors similarly insulated in the adjacent end of another section of cable.

It is well known that in making splices or joints of cables of this character great care is necessary in order that a perfect union of the conductors may be made, so as not to impair the conductivity of the line, and great care is necessary in insulating the joints from each other, so that the high specific insulation of the cable is maintained through the joints, as well as in the other portions thereof, and in applying my invention to this kind of a cable I make use of a disk G', which is of some highly-insulating material and which is provided, preferably, with a series of notches g, extending into the periphery of the block in position corresponding to the conductors A B, &c., and serving to support the ends of the conductors and maintain them in their proper relative positions. Thus in applying my invention, the ends of the conductor having been bared or freed from their insulatating material and armor in the manner before set forth, they are abutted together, and the abutted ends of each two corresponding conductors are preferably provided with conducting-sleeves E, which are adapted to fit the conductors and maintain their abutted ends in alignment. These sleeves fit closely in the notches g of the block G', and it will thus be seen that the united ends of the conductors are maintained in proper relation to each other and are supported by insulating material. I prefer, then, to wrap the block G' with some insulating material, as tape or yarn I, and this will serve to maintain the joints in their proper places in the block and to insulate them from each other and from surrounding material. The joint thus prepared is then in condition to receive the insulating material J, which may be poured thereon or otherwise applied so as to thoroughly and completely insulate each portion of the conductors from every other portion, when the whole is preferably covered with a metallic union F, whether in the shape of a sleeve or of a wiped or cast-metal joint, which adheres to the armor and forms a perfect mechanical union of the ends of the cable in the manner above stated. From this it will be seen that by the use of the simple insulating-block I am enabled to produce a substantial and symmetrical joint in which the parts are held in proper position with relation to each other, so as to maintain their insulation, while the joint can be quickly and easily made, the ends of the conductor not having to be insulated separately, the block and the binding therefor being found entirely sufficient and being quickly and easily applied.

It will be seen that in Fig. 6 I have shown my invention applied to a cable containing eight conductors, and the block is properly formed to be used in connection therewith, and of course it will be understood that the block will have a number of recesses or openings to correspond with the number of the conductors—for instance, Fig. 4 shows the block adapted for a two-conductor cable.

What I claim is—

1. In a joint for electric cables, the combination, with the adjacent ends of the cable-sections, of a recessed supporting-block of insulating material having the adjacent ends of the corresponding conductors united and supported in said recesses, substantially as described.

2. In a joint for electric cables, the combination, with the adjacent ends of the cable-sections, of supporting-blocks of insulating material and provided with recesses and having the adjacent ends of the corresponding conductors united and supported in said recesses, and insulating material applied to the conductors surrounding the block, substantially as described.

3. The combination, with the adjacent ends of the cables having a series of insulated metallic conductors, of a block of insulating material having peripheral recesses for the reception of the ends of the conductors, sleeves of conducting material embracing the adjacent ends of the corresponding conductors and fitting the recesses in the block, and insulating material surrounding the block and confining the sleeves in said recesses, the whole being provided with insulating material to form a substantial joint between the cables and adapted to maintain the united ends of the corresponding conductors in proper relation with each other and the adjacent conductors, substantially as described.

In testimony whereof I have signed my name to this specification in the presence of two subscribing witnesses.

JOSEPH W. MARSH.

Witnesses:
 F. L. FREEMAN,
 W. C. DUVALL.